United States Patent
Xi et al.

(10) Patent No.: US 9,667,334 B2
(45) Date of Patent: May 30, 2017

(54) METHOD AND APPARATUS FOR TRANSMITTING COMMON SIGNAL IN HYBRID BEAMFORMING

(71) Applicant: NTT DoCoMo, Inc., Tokyo (JP)

(72) Inventors: Wei Xi, Beijing (CN); Xiaolin Hou, Beijing (CN); Huiling Jiang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 14/974,003

(22) Filed: Dec. 18, 2015

(65) Prior Publication Data
US 2016/0182138 A1   Jun. 23, 2016

(30) Foreign Application Priority Data
Dec. 19, 2014   (CN) .......................... 2014 1 0799868

(51) Int. Cl.
*H04B 7/06*     (2006.01)
*H04B 7/0456*   (2017.01)

(52) U.S. Cl.
CPC ......... *H04B 7/0686* (2013.01); *H04B 7/0456* (2013.01); *H04B 7/0617* (2013.01); *H04B 7/0671* (2013.01)

(58) Field of Classification Search
CPC .. H04B 7/0686; H04B 7/0671; H04B 7/0617; H04B 7/0456
See application file for complete search history.

(56) References Cited

U.S. PATENT DOCUMENTS

| | | | |
|---|---|---|---|
| 2004/0179544 A1* | 9/2004 | Wilson | H01Q 1/246 370/442 |
| 2009/0225722 A1* | 9/2009 | Cudak | H04L 5/0007 370/330 |
| 2010/0238889 A1* | 9/2010 | Kim | H04L 5/0091 370/329 |
| 2013/0039445 A1* | 2/2013 | Hwang | H04B 7/0617 375/316 |
| 2014/0050280 A1* | 2/2014 | Stirling-Gallacher | H04B 7/0486 375/296 |
| 2014/0241449 A1* | 8/2014 | Prasad | H04B 7/0456 375/267 |
| 2014/0341310 A1* | 11/2014 | Rahman | H04B 7/0408 375/260 |
| 2015/0103934 A1* | 4/2015 | Nam | H04B 7/0413 375/260 |

(Continued)

OTHER PUBLICATIONS

Extended European Search Report for corresponding application EP 15193057.5-1874, EPO, Munich, issued Apr. 28, 2016.
(Continued)

*Primary Examiner* — Kenneth Lam
(74) *Attorney, Agent, or Firm* — Harness, Dickey & Pierce, P.L.C.

(57) ABSTRACT

The present disclosure provides a method and apparatus for transmitting a common signal in hybrid beamforming. The method includes: acquiring an analog common signal to be transmitted; selecting a different codeword for each RF chain from a codebook for analog beamforming and obtaining an analog beamformer; beamforming the analog common signal to be transmitted in each RF chain according to the analog beamformer; and transmitting the beamformed analog common signal in each RF chain.

8 Claims, 12 Drawing Sheets

(56) References Cited

U.S. PATENT DOCUMENTS

| | | | |
|---|---|---|---|
| 2015/0188682 A1* | 7/2015 | Noh | H04B 7/0452 370/329 |
| 2015/0288439 A1* | 10/2015 | Kim | H04B 7/0469 375/295 |
| 2015/0341093 A1* | 11/2015 | Ji | H04B 1/707 375/267 |
| 2016/0134352 A1* | 5/2016 | Stirling-Gallacher | H04B 7/0639 370/329 |
| 2016/0212643 A1* | 7/2016 | Park | H04B 7/0626 |
| 2016/0226640 A1* | 8/2016 | Seol | H04B 7/26 |
| 2016/0241323 A1* | 8/2016 | Ko | H04B 7/06 |

OTHER PUBLICATIONS

Damman A et al: "Beamforming in combination with space-time diversity for broadband OFDM systems", Proceedings of IEEE International Conference on Communications—Apr. 28-May 2, 2002—New York, NY, USA, IEEE, Piscataway, NJ, USA, vol. 1, Apr. 28, 2002 (Apr. 28, 2002), pp. 165-171.

* cited by examiner

METHOD AND APPARATUS FOR TRANSMITTING COMMON SIGNAL IN HYBRID BEAMFORMING

CROSS-REFERENCE TO RELATED APPLICATIONS

This application claims the benefit of priority from Chinese Patent Application, No. 201410799868.2, entitled "Method and apparatus for transmitting common signal in hybrid beamforming" and filed on Dec. 19, 2014, the entire content of which is hereby incorporated by reference.

FIELD OF THE DISCLOSURE

The present disclosure relates to wireless communication technologies, and more particularly to a method and apparatus for transmitting a common signal in hybrid beamforming and multi-user Multiple Input Multiple Output (MIMO).

BACKGROUND

With popularity of smart terminals and continuous development of demands on mobile new services, requirements on wireless transmission rate increases exponentially. As a result, when the four-generation (4G) mobile communication technologies are being applied, such as Long-Term Evolution (LTE) system, research on the five-generation (5G) mobile communication technologies has started. Compared with 4G, 5G should meet several key requirements, for example, 1) transmission rate is improved 10~100 times, experience rate to end users (UEs) is up to 1 Gb/s, and user peak rate is up to and beyond 10 Gb/s; 2) the density of connected devices is improved 10~100 times, up to millions per square kilometer. In order to fulfill the above-described requirements, and considering the limited spectrum resources which is available up till now, during research work on 5G, one method is to propose massive MIMO and use spectrum resources at high frequency, so as to further explore spatial dimensional radio resources and solve the problem about spectrum efficiency and power efficiency in future mobile communication.

Features of massive MIMO wireless communication technologies include: deploying tens of or hundreds of antennas in the coverage of base station, and placing those antennas in a massive array. Multiple users distributed in the coverage of base station communicate with the base station simultaneously on a same time and frequency resource by taking advantage of spatial freedom provided by the massive antennas configured at the base station, which can improve the multiplexing capability of spectrum resources among multiple users, spectral efficiency of each user's link and capability to suppress the inter-cell interference, so that the overall efficiency of spectrum resources may be enhanced greatly. In addition, by using the diversity gain and array gain provided by the massive antennas configured at the base station, the power efficiency of the communication link between each user and the base station may be improved further.

The wavelength of a high-frequency signal is short, so the high-frequency band is suitable for massive MIMO with densely deployed antenna elements. But the high-frequency signal tends to be more influenced by path loss, and a bottleneck caused by the significant increase of antenna number only at the base station occurs for the massive MIMO technologies. Thus, it can be seen that, massive MIMO is different from the current MIMO transmission technologies. It is required to research on the wireless transmission technologies which is feasible in the scenario of massive MIMO.

On the other hand, in massive MIMO, if one Radio Frequency (RF) chain is installed for each antenna element, complexity, power consumption and cost are increased. In this way, hybrid beamforming can enable multiple antenna elements to use one RF chain, thus it becomes a research topic as a low cost and feasible solution for massive MIMO.

SUMMARY

The present disclosure provides a method and apparatus for transmitting a common signal in hybrid beamforming to suppress the pathloss of high frequency signals and achieve an effective coverage area of the common signal in hybrid beamforming.

In an aspect, the present disclosure provides a method for transmitting a common signal in hybrid beamforming, comprising: acquiring an analog common signal to be transmitted; selecting a different codeword for each RF chain from a codebook for analog beamforming and obtaining an analog beamformer; beamforming the analog common signal to be transmitted in each RF chain according to the analog beamformer; and transmitting the beamformed analog common signal in each RF chain.

In another aspect, the present disclosure provides an apparatus for transmitting a common signal in hybrid beamforming, comprising: an analog common signal acquiring module, configured to acquire an analog common signal to be transmitted; an analog beamformer obtaining module, configured to select a different codeword for each RF chain from a codebook for analog beamforming and obtain an analog beamformer; an analog beamforming module, configured to beamform the analog common signal to be transmitted in each RF chain according to the analog beamformer; and a signal transmitting module, configured to transmit the beamformed analog common signal in each RF chain.

In yet another aspect, the present disclosure provides a device for transmitting a common signal in hybrid beamforming, the device comprises a processor and a memory communicated with the processor; in the memory, the instructions that are executed by the processor are stored, comprising an analog common signal acquiring instruction, an analog beamformer obtaining instruction, an analog beamforming instruction, and a signal transmitting instruction, wherein the analog common signal acquiring instruction indicates to acquire an analog common signal to be transmitted; the analog beamformer obtaining instruction indicates to select a different codeword for each RF chain from a codebook for analog beamforming and obtain an analog beamformer; the analog beamforming instruction indicates to beamform the analog common signal to be transmitted in each RF chain according to the analog beamformer; and the signal transmitting instruction indicates to transmit the beamformed analog common signal in each RF chain.

DETAILED DESCRIPTION

In hybrid beamforming, for the user signal, a user-specific beamforming may be used to transmit signals to the corresponding user. For the common signal, there are no corresponding transmission technologies available in the hybrid beamforming, so severe pathloss caused by using resources at a high-frequency band may reduce the coverage of the common signals.

In the present disclosure, the hybrid beamforming refers to the joint operations of analog beamforming and digital beamforming. The analog beamforming means performing beamforming in an analog domain, and the digital beamforming means performing beamforming in a digital domain.

The common signal refers to the signal transmitted in a common channel, including all the data except the user data. For example, in LTE or LTE-Advanced system, the common signal may be a Channel State Information-Reference Signal (CSI-RS), or a discovery signal (DS).

In order to solve the problem of reduced coverage of the common signal due to severe pathloss caused by using resources at a high-frequency band, according to examples of the present disclosure, the common signals are transmitted in beamforming; by considering the common signal are required to cover all the cell, the user-specific beamforming is not used for the common signal, but for each RF chain, different beamformers are selected from a codebook for analog beamforming, and the selected beamformers are used to beamform the analog common signal to be transmitted in different RF chains, such that, the common signal is transmitted in hybrid beamforming.

In order to make technical solutions and merits of the present disclosure clearer, the present disclosure will be described in detail in combination with examples and accompanying drawings.

Example 1

Figure 1:
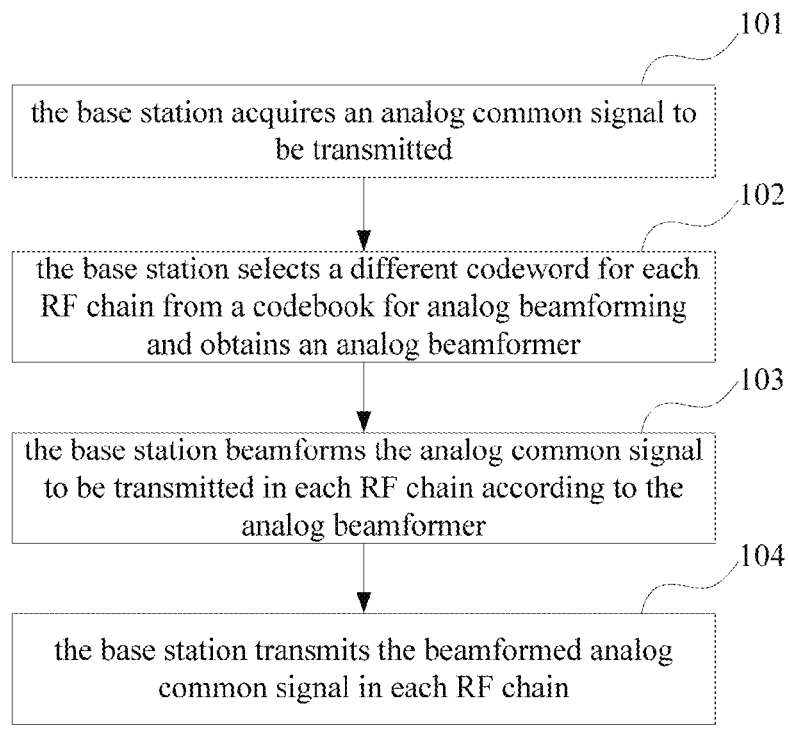
FIG. 1 is a flow chart illustrating a method for transmitting a common signal in hybrid beamforming according to a first example of the present disclosure.

FIG. 1 is a flow chart illustrating a method for transmitting a common signal in hybrid beamforming according to a first example of the present disclosure. As shown in FIG. 1, the method is applied in a base station, and includes the following procedures.

In block 101, the base station acquires an analog common signal to be transmitted.

In an example, the analog common signal to be transmitted may be obtained by performing digital-to-analog conversion (DAC) to a digital common signal.

Figure 2:
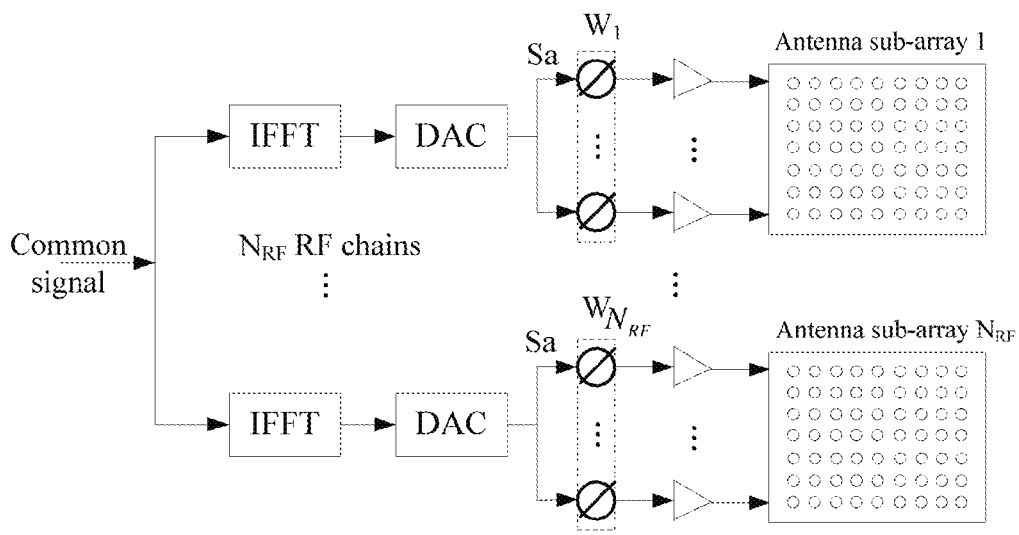
FIG. 2 is a schematic diagram illustrating a method for processing the common signal in hybrid beamforming according to a first example of the present disclosure.

FIG. 2 is a schematic diagram illustrating a method for processing the common signal in hybrid beamforming according to a first example of the present disclosure. As shown in FIG. 2, the signal Sa is the analog common signal to be transmitted.

In block 102, the base station selects a different codeword for each RF chain from a codebook for analog beamforming and obtains an analog beamformer.

Selecting a different codeword may enable the common signal to propagate along different directions. The codewords in the codebook for analog beamforming are generally configured by the antenna producer in advance. More codewords indicate high freedom and a relatively high cost.

In an example, 4 RF chains are configured and the codebook for analog beamforming includes 8 codewords. Assume the codebook is expressed as $$C_{analog} = \left\{ a\left(i\frac{\pi}{4}\right) \mid i = 0, 1, \ldots, 7 \right\} \quad (1)$$

wherein a(φ) denotes an array response of sub-array corresponding to a RF chain, i.e., a codeword in the codebook, φ denotes an angle of departure (AoD).

Assume 4 codewords are selected for 4 RF chains respectively, i.e., a(0), $$a\left(\frac{\pi}{2}\right),$$

a(π) and $$a\left(\frac{3\pi}{2}\right),$$

thus the analog beamformer is obtained as $$A = \text{diag}\left[\, a(0) \quad a\left(\frac{\pi}{2}\right) \quad a(\pi) \quad a\left(\frac{3\pi}{2}\right) \,\right] \quad (2)$$

In another example, other 4 codewords $$a\left(\frac{\pi}{4}\right), a\left(\frac{3\pi}{4}\right), a\left(\frac{5\pi}{4}\right)$$

and $$a\left(\frac{7\pi}{4}\right)$$

are selected for 4 RF chains respectively, thus the analog beamformer is obtained as $$A = \text{diag}\left[\, a\left(\frac{\pi}{4}\right) \quad a\left(\frac{3\pi}{4}\right) \quad a\left(\frac{5\pi}{4}\right) \quad a\left(\frac{7\pi}{4}\right) \,\right] \quad (3)$$

The codewords selecting may be performed according to a principle of achieving a uniform coverage in the cell based on the beam directions corresponding to the selected codewords. That is, the angles between any two adjacent beams are the same. Or, according to practical demands, the codewords selecting may also be performed according to a non-uniform distribution. For example, the angles between any two adjacent beams are different.

In block 103, the base station beamforms the analog common signal to be transmitted in each RF chain according to the analog beamformer.

As shown in FIG. 2, when 4 RF chains are configured and the codebook for analog beamforming includes 8 codewords, $N_{RF}=4$, $w_1=a(0)$, $$w_2 = a\left(\frac{\pi}{2}\right)$$

(not illustrated in FIG. 2), $w_3=a(\pi)$ (not illustrated in FIG. 2), and $$w_{N_{RF}} = a\left(\frac{3\pi}{2}\right).$$

In block 104, the base station transmits the beamformed analog common signal in each RF chain.

Figure 3:
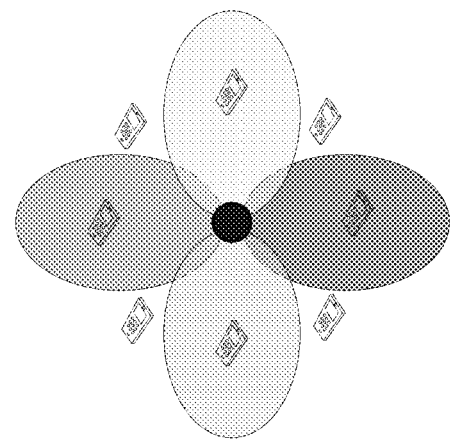
FIG. 3 is a schematic diagram illustrating a power spectrum of an antenna model according to the first example of the present disclosure.

FIG. 3 is a schematic diagram illustrating a power spectrum of an antenna model according to the first example of the present disclosure. The power spectrum represents the relationship between a power vs a beam direction. In the example, 4 RF chains are configured and the codebook for analog beamforming includes 8 codewords. As shown in FIG. 3, the beamformed common signals may cover the directions with steering angles of 0, $$\frac{\pi}{2},$$

π and $$\frac{3\pi}{2}.$$

In the example 1 as described above, all the RF chains (i.e., 4 RF chains) are used. In practical applications, part of RF chains may be used.

In addition, although digital beamforming is not described in the example 1 and shown in FIG. 1, it is equivalent to use a digital beamformer $D(k)=[1\ 1\ 1\ 1]^T$ to beamform the digital common signal before acquiring the analog common signal.

Figure 4:
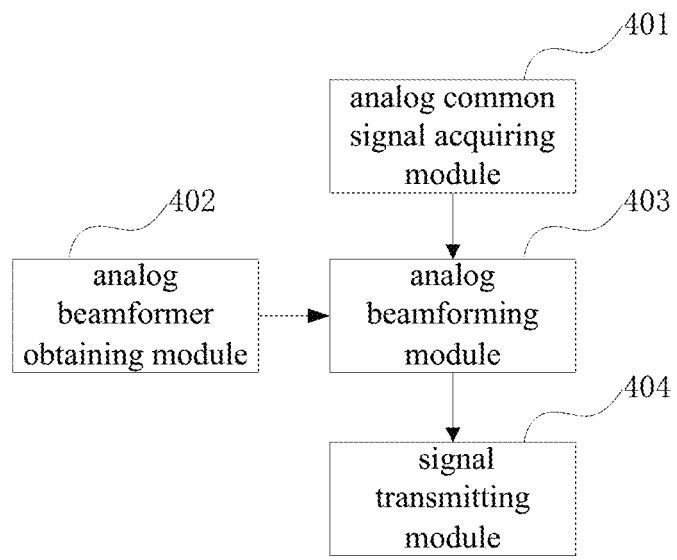
FIG. 4 is a schematic diagram illustrating a structure of an apparatus for transmitting a common signal in hybrid beamforming according to a first example of the present disclosure.

FIG. 4 is a schematic diagram illustrating a structure of an apparatus for transmitting a common signal in hybrid beamforming according to a first example of the present disclosure. As shown in FIG. 4, the apparatus includes: an analog common signal acquiring module 401, an analog beamformer obtaining module 402, an analog beamforming module 403 and a signal transmitting module 404.

The analog common signal acquiring module 401 is configured to acquire an analog common signal to be transmitted.

The analog beamformer obtaining module 402 is configured to select a different codeword for each RF chain from a codebook for analog beamforming and obtain an analog beamformer.

The analog beamforming module 403 is configured to beamform the analog common signal to be transmitted in each RF chain according to the analog beamformer.

The signal transmitting module 404 is configured to transmit the beamformed analog common signal in each RF chain. In an example, the signal transmitting module 404 may include an antenna sub-array corresponding to each RF chain.

Operations of modules as shown in FIG. 4 are the same as the steps described in the method example 1 as shown in FIG. 1, which are not described in detail herein.

Example 2

Figure 5:
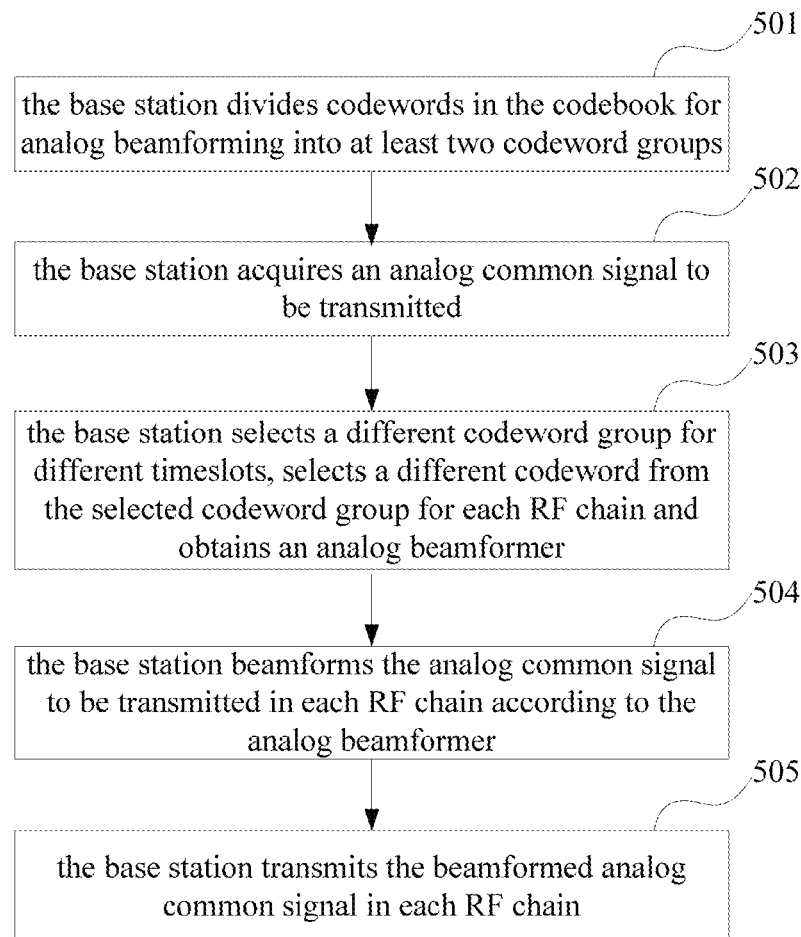
FIG. 5 is a flow chart illustrating a method for transmitting a common signal in hybrid beamforming according to a second example of the present disclosure.

FIG. 5 is a flow chart illustrating a method for transmitting a common signal in hybrid beamforming according to a second example of the present disclosure. As shown in FIG. 5, the method is applied in a base station, and includes the following procedures.

In block 501, the base station divides codewords in the codebook for analog beamforming into at least two codeword groups, wherein each codeword group includes at least one codeword.

As described in the example 1, when 4 RF chains are configured and the codebook for analog beamforming includes 8 codewords, those 8 codewords are divided into two codeword groups, for example, a(0), $$a\left(\frac{\pi}{2}\right),$$

a(π) and $$a\left(\frac{3\pi}{2}\right)$$

are divided into one group, denoted as the first codeword group;

$$a\left(\frac{\pi}{4}\right), a\left(\frac{3\pi}{4}\right), a\left(\frac{5\pi}{4}\right)$$

and $$a\left(\frac{7\pi}{4}\right)$$

are divided into the other group, denoted as the second codeword group.

In practical applications, the number of groups may be configured more than two according to practical scenarios.

In practical applications, in block 501, the codeword groups may be divided in advance, or performed once when the method is executed for the first time and the resulted groups are used in the following steps, or the codeword groups are re-divided when required. For example, according to the users' distribution, the codeword groups are re-divided as: a(0), $$a\left(\frac{\pi}{4}\right), a\left(\frac{\pi}{2}\right)$$

and $$a\left(\frac{3\pi}{4}\right)$$

in the first codeword group, and a(π), $$a\left(\frac{5\pi}{4}\right), a\left(\frac{3\pi}{2}\right)$$

and $$a\left(\frac{7\pi}{4}\right)$$

in the second codeword group.

In block 502, the base station acquires an analog common signal to be transmitted.

Description of block 502 is same as block 101, which is not described in detail herein.

Figure 6:
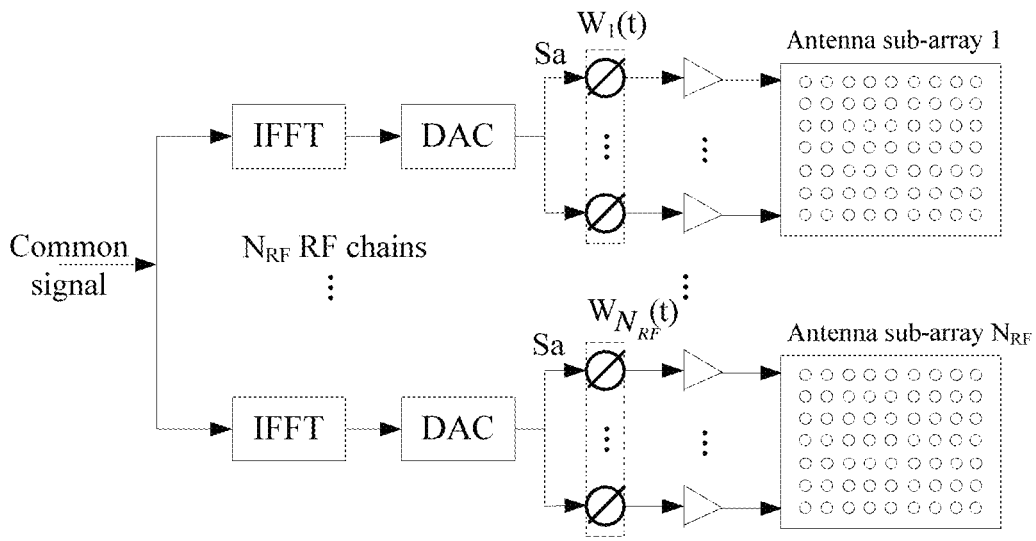
FIG. 6 is a schematic diagram illustrating a method for processing the common signal in hybrid beamforming according to a second example of the present disclosure.

FIG. 6 is a schematic diagram illustrating a method for processing the common signal in hybrid beamforming according to a second example of the present disclosure. As shown in FIG. 6, the signal Sa is the analog common signal to be transmitted.

In block 503, the base station selects a different codeword group for adjacent timeslots, selects a different codeword from the selected codeword group for each RF chain and obtains an analog beamformer.

For example, in the case of the first codeword group and the second codeword group as described above, in the first timeslot, the first codeword group is selected, and the analog beamformer is obtained as $$A = \mathrm{diag}\left[ a(0) \quad a\left(\frac{\pi}{2}\right) \quad a(\pi) \quad a\left(\frac{3\pi}{2}\right) \right];$$

in the second timeslot, the second codeword group is selected, and the analog beamformer is obtained as $$A = \mathrm{diag}\left[ a\left(\frac{\pi}{4}\right) \quad a\left(\frac{3\pi}{4}\right) \quad a\left(\frac{5\pi}{4}\right) \quad a\left(\frac{7\pi}{4}\right) \right];$$

in the third timeslot, the first codeword group is selected again, and the analog beamformer is obtained as $$A = \mathrm{diag}\left[ a(0) \quad a\left(\frac{\pi}{2}\right) \quad a(\pi) \quad a\left(\frac{3\pi}{2}\right) \right];$$

in the fourth timeslot, the second codeword group is selected again, and the analog beamformer is obtained as $$A = \mathrm{diag}\left[ a\left(\frac{\pi}{4}\right) \quad a\left(\frac{3\pi}{4}\right) \quad a\left(\frac{5\pi}{4}\right) \quad a\left(\frac{7\pi}{4}\right) \right],$$

and so on. Here, the first timeslot, the second timeslot, the third timeslot and the fourth timeslot only stand for a sequence in time domain, but not refer to the real number of timeslots. For example, the first timeslot may correspond to timeslot #0 within the frame structure, and the second timeslot may correspond to timeslot #1 within the frame structure, etc.

In block 504, the base station beamforms the analog common signal to be transmitted in each RF chain according to the analog beamformer.

In the case of the first codeword group and the second codeword group as described above, as shown in FIG. 5, $N_{RF}=4$, t is a time variable, for example, two analog beamformers are obtain ad follows:

$$\begin{cases} \begin{cases} w_1(t) = a(0) \\ w_2(t) = a\left(\frac{\pi}{2}\right) \\ w_3(t) = a(\pi) \\ w_{N_{RF}}(t) = a\left(\frac{3\pi}{2}\right) \end{cases} t = 1, 3, 5, 7 \ldots ; \\ \begin{cases} w_1(t) = a\left(\frac{\pi}{4}\right) \\ w_2(t) = a\left(\frac{3\pi}{4}\right) \\ w_3(t) = a\left(\frac{5\pi}{4}\right) \\ w_{N_{RF}}(t) = a\left(\frac{7\pi}{4}\right) \end{cases} t = 2, 4, 6, 8 \ldots ; \end{cases} \quad (4)$$

In the above expression, the values 1, 3, 5, 7 . . . and 2, 4, 6, 8 . . . only stand for a sequence in time domain, but not refer to the real number of timeslots.

In block 505, the base station transmits the beamformed analog common signal in each RF chain.

Figure 7A:
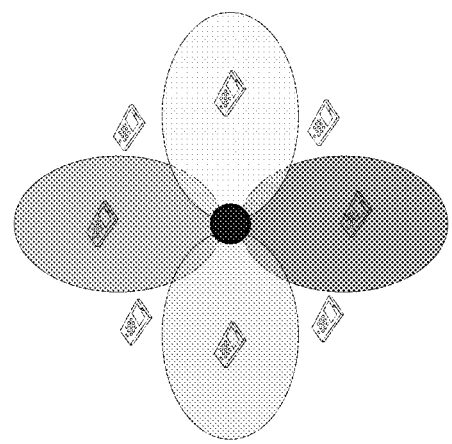
FIG. 7a is a schematic diagram illustrating a power spectrum of an antenna model using the first codeword group according to a second example of the present disclosure.
Figure 7B:
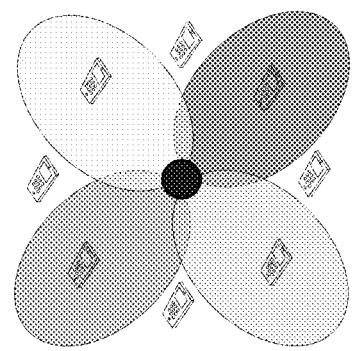
FIG. 7b is a schematic diagram illustrating a power spectrum of an antenna model using the second codeword group according to a second example of the present disclosure.

FIG. 7a is a schematic diagram illustrating a power spectrum of an antenna model using the first codeword group according to a second example of the present disclosure. FIG. 7b is a schematic diagram illustrating a power spectrum of an antenna model using the second codeword group according to a second example of the present disclosure. In the examples, 4 RF chains are configured and codewords in the codebook are divided into the first codeword group and the second codeword group. In one slot, as shown FIG. 7a, common signals may cover the directions with steering angles of 0, $$\frac{\pi}{2},$$

π and $$\frac{3\pi}{2},$$

and in another slot, as shown FIG. 7b, common signals may cover the directions with steering angles of $$\frac{\pi}{4}, \frac{3\pi}{4}, \frac{5\pi}{4}$$

and $$\frac{7\pi}{4}.$$

Hence, compared with example 1, example 2 may further improve the effective coverage area of the common signals.

In the example 2 as described above, all the RF chains (i.e., 4 RF chains) are used. In practical applications, part of RF chains may be used. And the number of codeword groups may be more than two. For example, when two RF chains are used, 8 codewords may be divided into 4 codeword groups.

In addition, although digital beamforming is not described in the example 2 and shown in FIG. 5, it is equivalent to use a digital beamformer $D(k)=[1\ 1\ 1\ 1]^T$ to beamform the digital common signal before acquiring the analog common signal.

Figure 8:
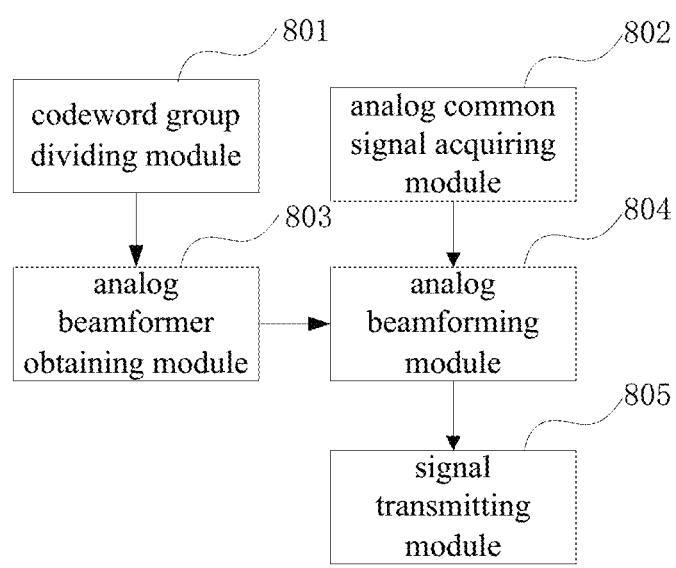
FIG. 8 is a schematic diagram illustrating a structure of an apparatus for transmitting a common signal in hybrid beamforming according to a second example of the present disclosure.

FIG. 8 is a schematic diagram illustrating a structure of an apparatus for transmitting a common signal in hybrid beamforming according to a second example of the present disclosure. As shown in FIG. 8, the apparatus includes: a codeword group dividing module 801, an analog common signal acquiring module 802, an analog beamformer obtaining module 803, an analog beamforming module 804 and a signal transmitting module 805.

The codeword group dividing module 801 is configured to divide codewords in the codebook for analog beamforming into at least two codeword groups, wherein each codeword group includes at least one codeword.

The analog common signal acquiring module 802 is configured to acquire an analog common signal to be transmitted.

The analog beamformer obtaining module 803 is configured to select a different codeword for each RF chain from a codebook for analog beamforming and obtain an analog beamformer.

The analog beamforming module 804 is configured to beamform the analog common signal to be transmitted in each RF chain according to the analog beamformer.

The signal transmitting module 805 is configured to transmit the beamformed analog common signal in each RF chain. In an example, the signal transmitting module 404 may include an antenna sub-array corresponding to each RF chain.

Operations of modules as shown in FIG. 8 are the same as the steps described in the method example 2 as shown in FIG. 5, which are not described in detail herein.

Example 3

Based on any one of the above-described example 1 and example 2, in the example 3, the procedures of digital beamforming for the common signal are added.

Figure 9A:
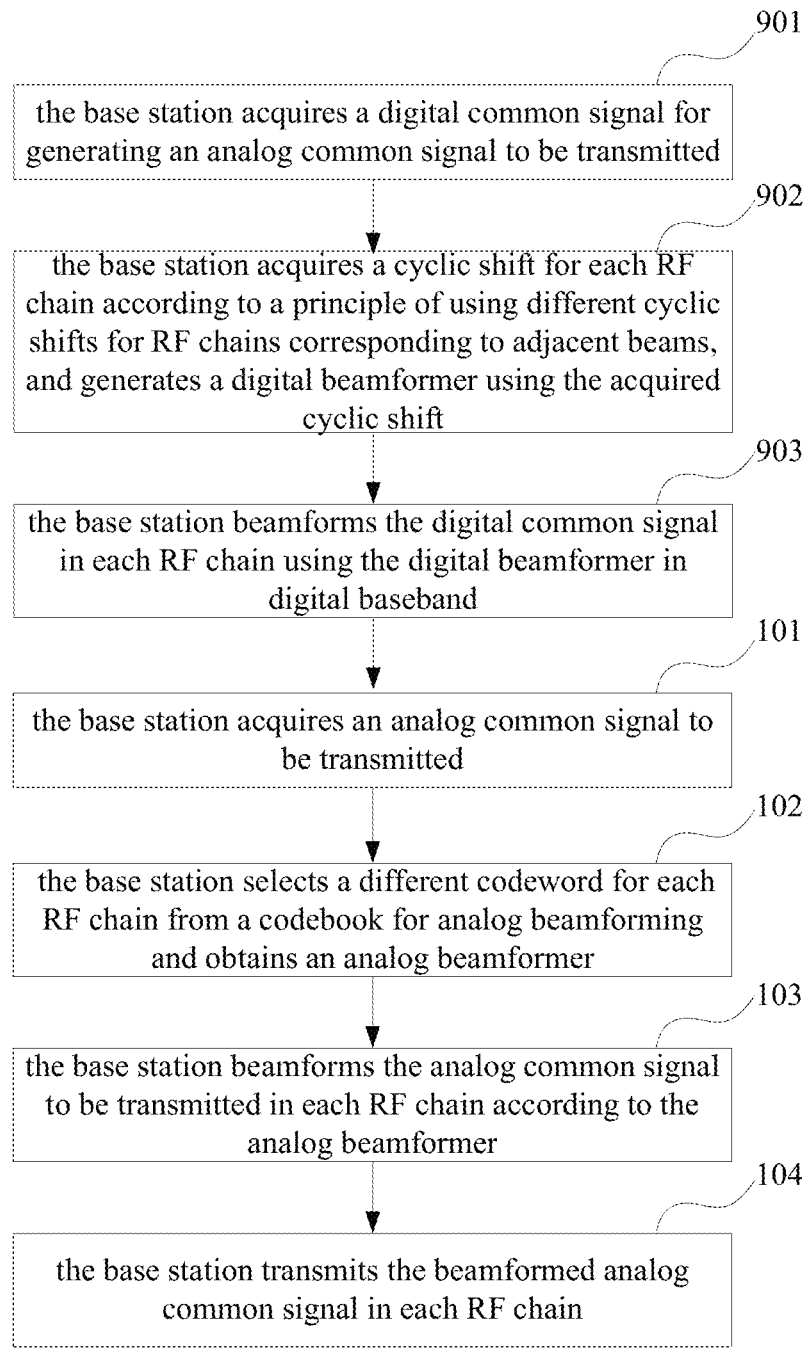
FIG. 9a is a flow chart illustrating a method for transmitting a common signal in hybrid beamforming according to a third example of the present disclosure.
Figure 9B:
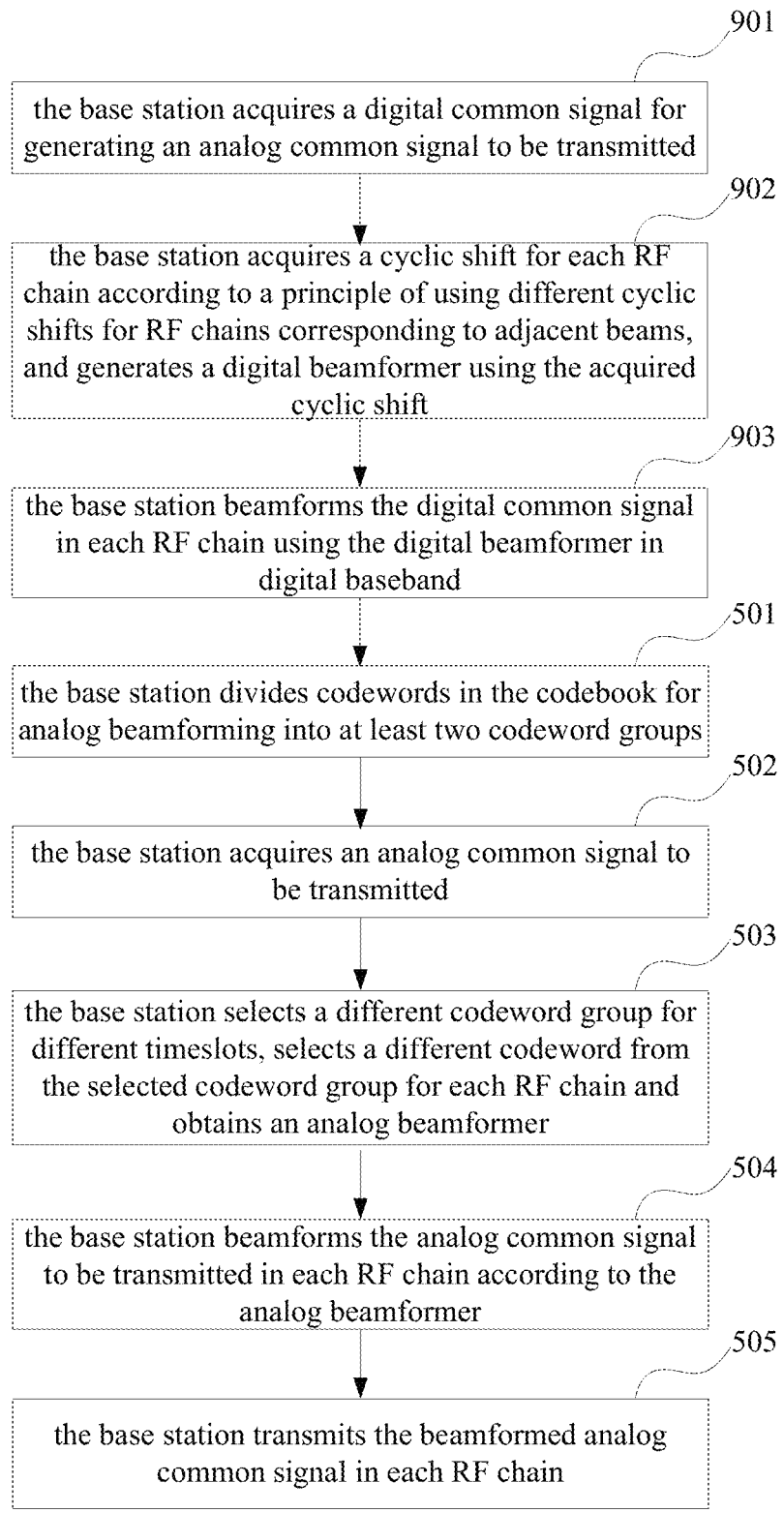
FIG. 9b is a flow chart illustrating another method for transmitting a common signal in hybrid beamforming according to a third example of the present disclosure.

FIG. 9a is a flow chart illustrating a method for transmitting a common signal in hybrid beamforming according to a third example of the present disclosure. FIG. 9b is a flow chart illustrating another method for transmitting a common signal in hybrid beamforming according to a third example of the present disclosure. As shown in FIG. 9a and FIG. 9b, the method includes the following procedures.

In block 901, the base station acquires a digital common signal for generating an analog common signal to be transmitted.

Figure 10A:
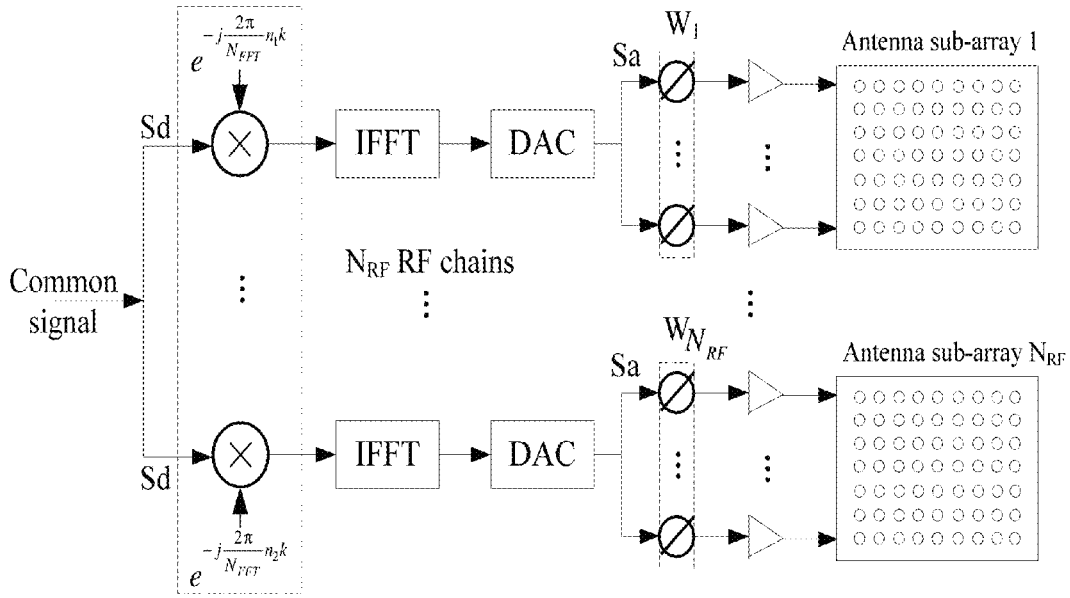
FIG. 10a is a schematic diagram illustrating a method for processing the common signal in hybrid beamforming according to a third example of the present disclosure.
Figure 10B:
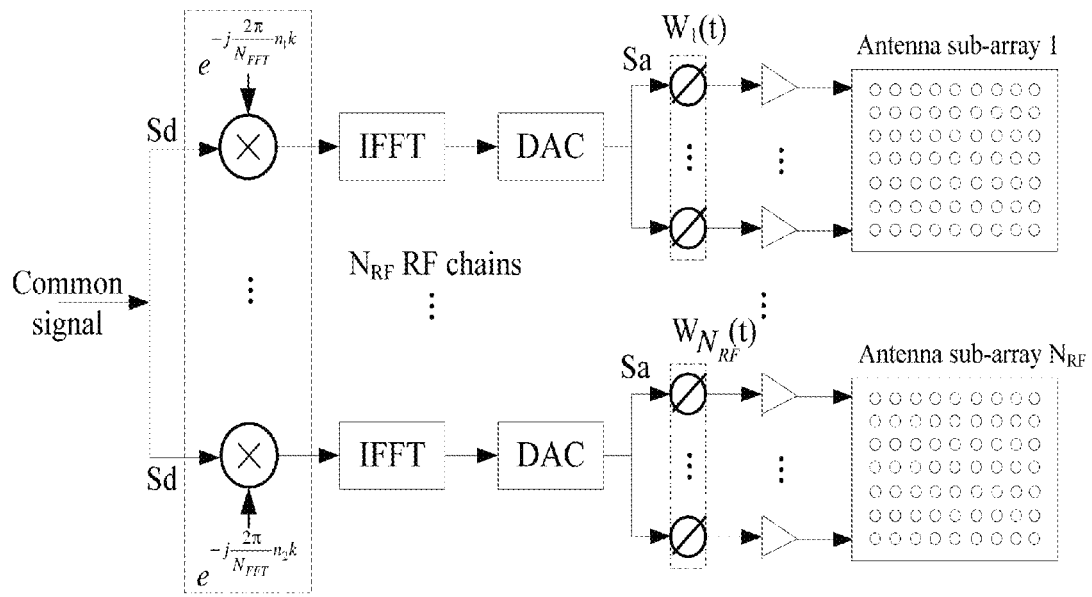
FIG. 10b is a schematic diagram illustrating another method for processing the common signal in hybrid beamforming according to a third example of the present disclosure.

FIG. 10a is a schematic diagram illustrating a method for processing the common signal in hybrid beamforming according to a third example of the present disclosure. FIG. 10b is a schematic diagram illustrating another method for processing the common signal in hybrid beamforming according to a third example of the present disclosure. As shown in FIG. 10a and FIG. 10b, the signal Sd is the digital common signal, and the Sa is the corresponding analog common signal to be transmitted.

In block 902, the base station acquires a cyclic shift for each RF chain according to a principle of using different cyclic shifts for RF chains corresponding to adjacent beams, and generates a digital beamformer using the acquired cyclic shift, so that received signal power of common signals in the RF chains corresponding to adjacent beams are overlaid. Preferably, received signal power of common signals in the RF chains corresponding to adjacent beams is overlaid orthogonally or quasi-orthogonally.

In an example, cyclic shifts may be calculated according to the maximum multipath delay spread of the Channel Impulse Response (CIR) and the size of Discrete Fourier Transform (DFT). For example, the cyclic shift may be calculated as follows:

$$n_k = k \frac{N_{FFT}}{M} \qquad (5)$$

wherein M is the maximum multipath delay spread of the effective CIR (ECIR), and $N_{FFT}$ is the size of DFT, k=0, 1, . . . , M−1.

In digital baseband, different RF chains corresponding to adjacent beams are beamformed with different cyclic shifts. For RF chains corresponding to non-adjacent beams, a same cyclic shift or different cyclic shifts may be used. For example, when the number of optional cyclic shifts is limited, RF chains corresponding to non-adjacent beams may be beamformed with a same cyclic shift. That is, at least it should be fulfilled that different cyclic shifts are used for the RF chains corresponding to adjacent beams, which may be applied to high frequency-selective channel scenario.

In the above-described example 1 and example 2, as 4 RF chains are configured and the codebook for analog beamforming includes 8 codewords, assume two cyclic shifts are obtained, i.e., $n_1$=0, $n_2$=$N_{FFT}$/2, thus, among 4 RF chains, RF chain 1 and RF chain 3 may use $n_1$, RF chain 2 and RF chain 4 may use $n_2$. Accordingly, a digital beamformer may be generated as follows:

$$D(k) = \begin{bmatrix} e^{-j\frac{2\pi}{N_{FFT}}n_1 k} \\ e^{-j\frac{2\pi}{N_{FFT}}n_2 k} \\ e^{-j\frac{2\pi}{N_{FFT}}n_1 k} \\ e^{-j\frac{2\pi}{N_{FFT}}n_2 k} \end{bmatrix} \qquad (6)$$

In the example 1 and example 2, it is equivalent to use a digital beamformer D(k)=[1 1 1 1]$^T$ to beamform the digital common signal before acquiring the analog common signal.

By generating a digital beamformer in block 902, it can be determined that the RF chains using different cyclic shifts may steer to adjacent beams. Thus, when performing block 102 in FIG. 9a and block 503 in FIG. 9b, with respect to the RF chains using different cyclic shifts as described in block 902, different codes which can steer to adjacent beams are selected.

In block 903, the base station beamforms the digital common signal in each RF chain using the digital beamformer in digital baseband.

Further, the beamformed digital common signals may be performed with Inverse Fourier Transform (IFT) and DAC to obtain the analog common signal. Then, the base station performs the procedures of FIG. 1 as shown in FIG. 9a or performs the procedures of FIG. 5 as shown in FIG. 9b, which are not described in detail herein.

Figure 11:
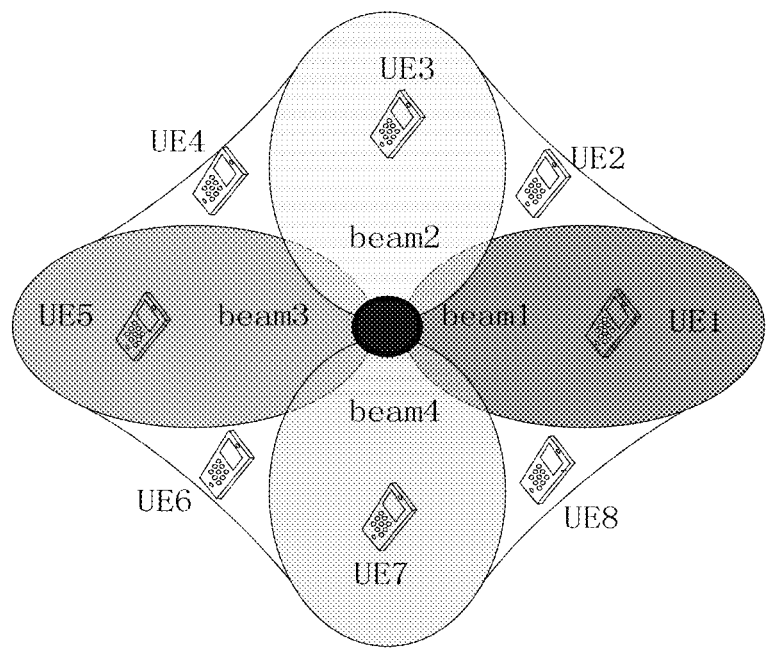
FIG. 11 is a schematic diagram illustrating a power spectrum of an antenna model according to a third example of the present disclosure.

FIG. 11 is a schematic diagram illustrating a power spectrum of an antenna model according to a third example of the present disclosure. As shown in FIG. 11, common signals may cover the directions with steering angles of 0, $$\frac{\pi}{2},$$

π and $$\frac{3\pi}{2}.$$

It can be seen that the range of coverage between any two of steering angles are enlarged by power overlay.

As shown in FIG. 11, UE1, UE3, UE5 and UE7 are covered by separate beams, UE 2 are covered jointly by beam 1 and beam 2, UE 4 are covered jointly by beam 2 and beam 3, UE 6 are covered jointly by beam 3 and beam 4, and UE 8 are covered jointly by beam 4 and beam 1.

Figure 12:
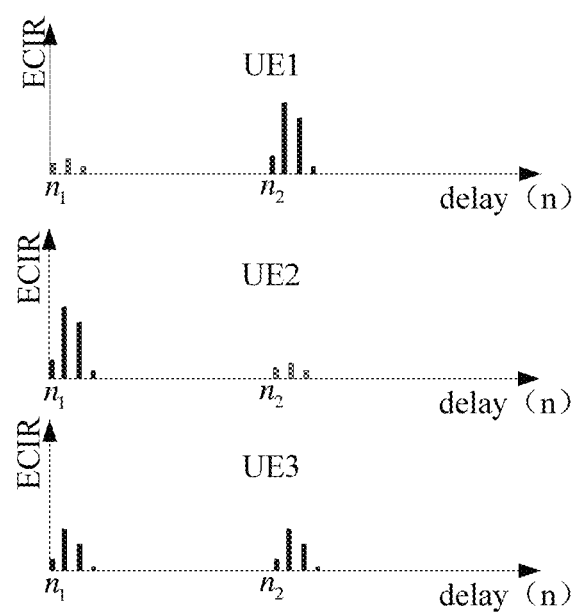
FIG. 12 is a schematic diagram illustrating ECIR of UE 1, UE 2 and UE3 according to an example of the present disclosure.

FIG. 12 is a schematic diagram illustrating ECIR of UE1, UE 2 and UE3 according to an example of the present disclosure. For example, for UE 3, by digital beamforming with cyclic shifts and without cyclic shifts, the received signal power, its Probability Distribution Function (PDF), mean value and variance are compared as follows.

The received signal power with respect to digital beamforming without cyclic shifts is $$P_{non-cs}(n) = \frac{P_t}{4}\|h_1(n) + h_2(n)\|^2 \qquad (7)$$

The received signal power with respect to digital beamforming with cyclic shifts is $$P_{cs}(n) = \frac{P_t}{4}\|h_1(n-n_1) + h_2(n-n_2)\|^2 \qquad (8)$$

wherein $P_t$ is the overall transmission power, $h_1(n)$ and $h_2(n)$ are independently and identically distributed (i.i.d.) zero-mean circularly symmetric complex Gaussian (CSCG) random variables, i.e., $h_1(n) \sim CN[0, \sigma_1^2(n)]$, $h_2(n) \sim CN[0, \sigma_2^2(n)]$.

With respect to digital beamforming without cyclic shifts, the PDF is expressed as $$p_{non-cs}(x) = \frac{4}{P_t[\sigma_1^2(n) + \sigma_2^2(n)]} \exp\left\{-\frac{4x}{P_t[\sigma_1^2(n) + \sigma_2^2(n)]}\right\}, \qquad (9)$$
$$x \geq 0$$

The mean value is expressed as $$\varepsilon[P_{non-cs}(n)] = \frac{P_t}{4}[\sigma_1^2(n) + \sigma_2^2(n)] \qquad (10)$$

The variable is expressed as $$v[P_{non-cs}(n)] = \frac{P_t^2}{16}[\sigma_1^2(n) + \sigma_2^2(n)]^2 \quad (11)$$

With respect to digital beamforming with cyclic shifts, the PDF is expressed as $$p_{cs}(x) = \frac{4}{P_t[\sigma_1^2(n) - \sigma_2^2(n)]}\left\{\exp\left[-\frac{4x}{P_t\sigma_1^2(n)}\right] - \exp\left[-\frac{4x}{P_t\sigma_2^2(n)}\right]\right\}, \quad (12)$$

$$x \geq 0$$

The mean value is expressed as $$\varepsilon[P_{cs}(n)] = \frac{P_t}{4}[\sigma_1^2(n) + \sigma_2^2(n)] \quad (13)$$

The variable is expressed as $$v[P_{cs}(n)] = \frac{P_t^2}{16}[\sigma_1^4(n) + \sigma_2^4(n)] < \frac{P_t^2}{16}[\sigma_1^2(n) + \sigma_2^2(n)]^2 = v[P_{non-cs}(n)] \quad (14)$$

By comparison, the variance when using the digital beamforming with cyclic shifts is smaller than the variance when using the digital beamforming without cyclic shifts. Hence, the robustness when using cyclic shifts is better.

Figure 13A:
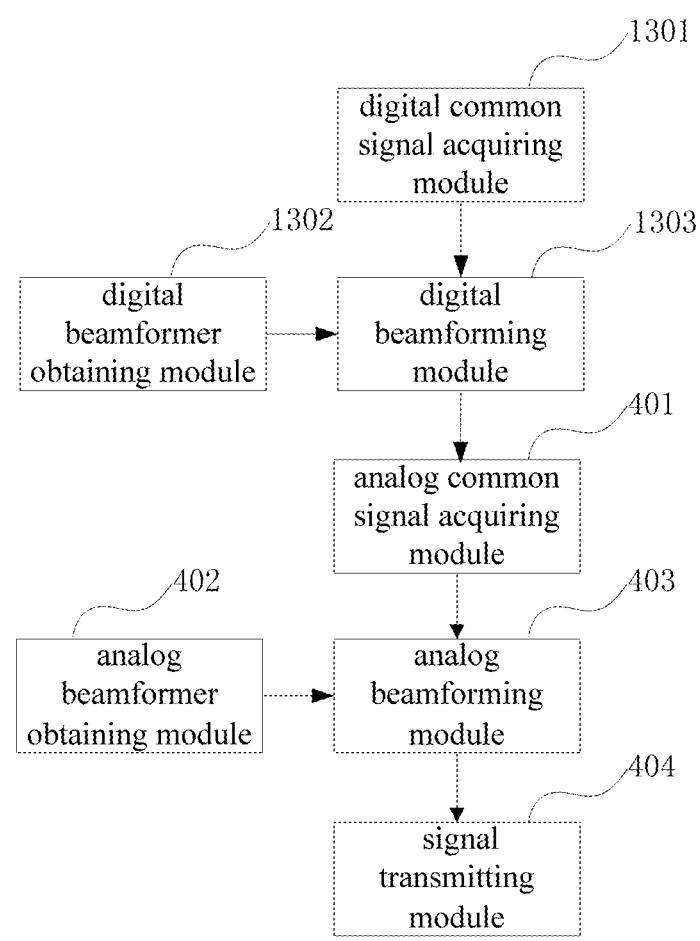
FIG. 13a is a schematic diagram illustrating a structure of an apparatus for transmitting a common signal in hybrid beamforming according to a third example of the present disclosure.
Figure 13B:
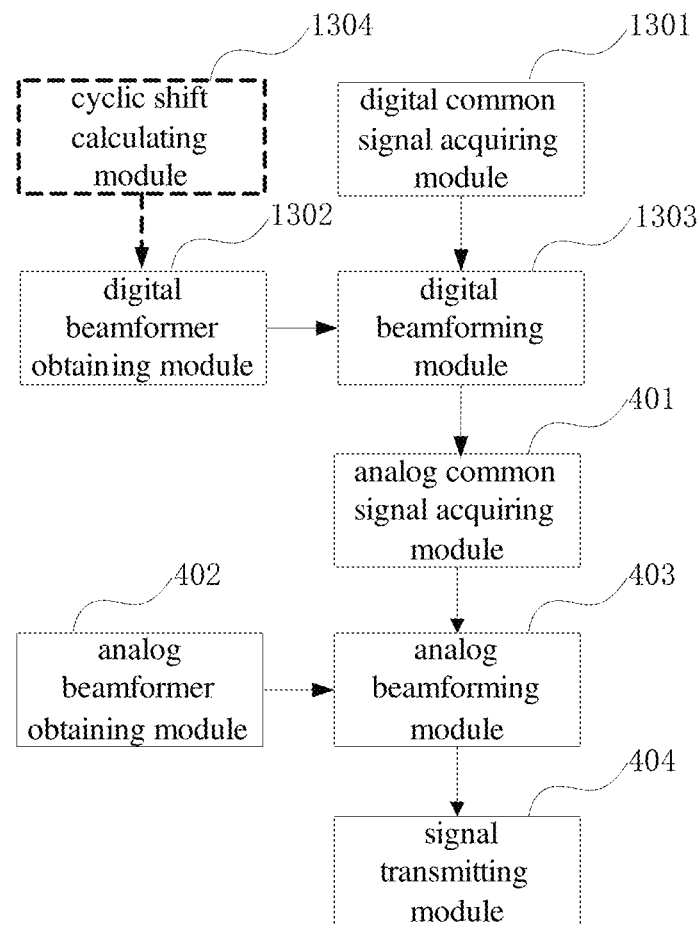
FIG. 13b is a schematic diagram illustrating a structure of another apparatus for transmitting a common signal in hybrid beamforming according to a third example of the present disclosure.

FIG. 13a is a schematic diagram illustrating a structure of an apparatus for transmitting a common signal in hybrid beamforming according to a third example of the present disclosure. FIG. 13b is a schematic diagram illustrating a structure of another apparatus for transmitting a common signal in hybrid beamforming according to a third example of the present disclosure. As shown in FIG. 13a and FIG. 13b, besides the modules of the apparatuses described in example 1 and example 2, the apparatus further includes: a digital common signal acquiring module 1301, a digital beamformer obtaining module 1302 and a digital beamforming module 1303.

The digital common signal acquiring module 1301 is configured to acquire a digital common signal for generating the analog common signal to be transmitted.

The digital beamformer obtaining module 1302 is configured to acquire a cyclic shift for each RF chain according to a principle of using different cyclic shifts for RF chains corresponding to adjacent beams, and obtain a digital beamformer using the acquired cyclic shift;

The digital beamforming module 1303 is configured to beamform the digital common signal in each RF chain using the digital beamformer in digital baseband.

In an example, the cyclic shift may be calculated according to a maximum multipath delay spread of a CIR and a size of DFT. Accordingly, the apparatus further comprises a cyclic shift calculating module 1304, configured to calculate the cyclic shift according to a maximum multipath delay spread of a CIR and a size of DFT, and send the cyclic shift to the digital beamformer generating module.

Figure 14:
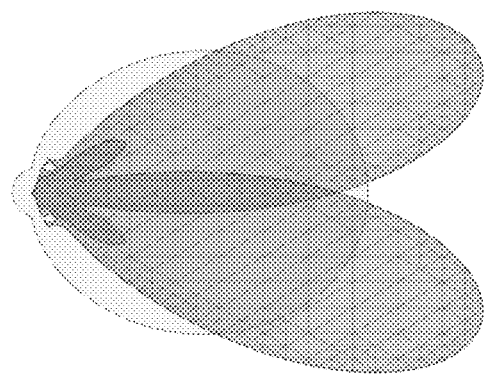
FIG. 14 is a schematic diagram illustrating a power spectrum of an antenna model according to a first example of the present disclosure and a conventional scheme.
Figure 15:
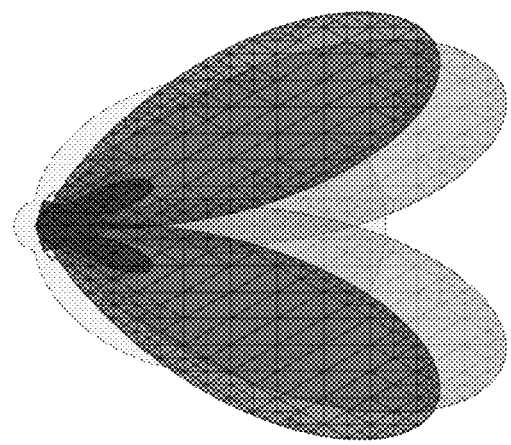
FIG. 15 is a schematic diagram illustrating a power spectrum of an antenna model according to a second example of the present disclosure and a conventional scheme.
Figure 16:
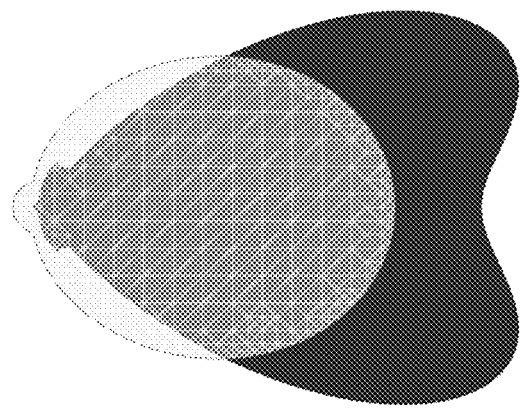
FIG. 16 is a schematic diagram illustrating a power spectrum of an antenna model according to a third example of the present disclosure and a conventional scheme.

By simulation, methods described in the above three examples and a conventional scheme without beamforming is analyzed in terms of coverage area hereinafter. As shown in FIG. 14 to FIG. 16, the lightest oval at the far left corresponds to the a power spectrum of the antenna model in the conventional scheme, and the deeper oval at the right corresponds to the a power spectrum of the antenna model in the examples of the present disclosure.

Following are the simulation parameters in Table 1.

| Item | parameter |
| --- | --- |
| Overall Tx power | 46 dBm |
| Number of RF chains | 2 |
| Size of antenna sub-array in each RF chain | 10 antenna elements |
| Analog beamforming codebook | $\{a(\theta) \mid \theta = 0, \pm\frac{\pi}{9}, \pm\frac{\pi}{6}\}$ |
| Antenna gain+ connection loss | 17 dBi |
| Antenna model (dB) | $A(\phi) = -\min\left[12\left(\frac{\phi}{\phi 3dB}\right)^2, A_m\right]$, wherein $\phi 3dB = 70°$, $A_m = 25dB$ |
| Pathloss (dB) | $PL(d) = 22\log_{10}(d) + 28 + 20\log_{10}(f_c)$, wherein $f_c = 3.5$ GHz |
| Threshold of the coverage | −40 dBm |

FIG. 14 is a schematic diagram illustrating a power spectrum of an antenna model according to a first example of the present disclosure and a conventional scheme. The analog beamformer is A=diag[a(π/9) a(−π/9)].

It can be seen that, the effective distance in the coverage area according to the example 1 is larger than that according to the conventional scheme, so that the pathloss of high frequency signals is well suppressed. The effective coverage area may change with the steering angle.

FIG. 15 is a schematic diagram illustrating a power spectrum of an antenna model according to a second example of the present disclosure and a conventional scheme. The analog beamformers are $A_f$=diag[a(π/9) a(−π/9)] and $A_\square$=diag[a(π/6) a(−π/6)].

According to the example 2, dynamic beamforming is achieved by using these two beamformers in Time Division Multiplex (TDM). Compared with the conventional scheme, the coverage area is enlarged.

FIG. 16 is a schematic diagram illustrating a power spectrum of an antenna model according to a third example of the present disclosure and a conventional scheme. The analog beamformer is A=diag[a(π/9) a(−π/9)], the digital beamformer is $D(k)=[1 \; e^{-jk\pi}]^T$.

It can be seen that, according to the example 3, effective and robust coverage area is provided.

Figure 17:
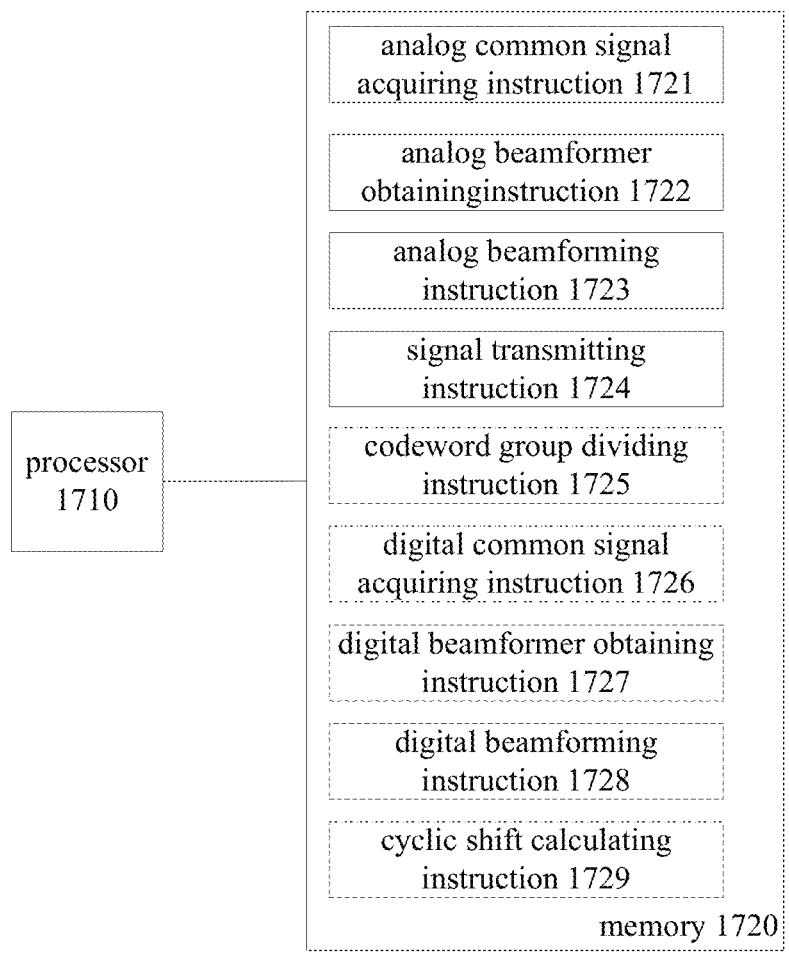
FIG. 17 is a schematic diagram illustrating a structure of a device for transmitting a common signal in hybrid beamforming according to an example of the present disclosure.

FIG. 17 is a schematic diagram illustrating a structure of a device for transmitting a common signal in hybrid beamforming according to an example of the present disclosure. As shown in FIG. 17, the device comprises a processor 1710 and a memory 1720 communicated with the processor 1710; in the memory 1720, the instructions that are executed by the processor are stored, comprising an analog common signal acquiring instruction 1721, an analog beamformer obtaining instruction 1722, an analog beamforming instruction 1723, and a signal transmitting instruction 1724.

The analog common signal acquiring instruction 1721 indicates to acquire an analog common signal to be transmitted. The analog beamformer obtaining instruction 1722 indicates to select a different codeword for each RF chain from a codebook for analog beamforming and obtain an analog beamformer. The analog beamforming instruction 1723 indicates to beamform the analog common signal to be transmitted in each RF chain according to the analog beamformer. The signal transmitting instruction 1724 indicates to transmit the beamformed analog common signal in each RF chain.

In an example, the memory 1720 may further store: a codeword group dividing instruction 1725, which indicates to divide codewords in the codebook for analog beamforming into at least two codeword groups, wherein each codeword group includes at least one codeword.

Accordingly, the analog beamformer obtaining instruction 1722 indicates to select different codeword groups for adjacent timeslots, select a different codeword from the selected codeword group for each RF chain and obtain an analog beamformer.

In an example, the memory 1720 may further store: a digital common signal acquiring instruction 1726, which indicates to acquire a digital common signal for generating the analog common signal to be transmitted; a digital beamformer obtaining instruction 1727, which indicates to acquire a cyclic shift for each RF chain according to a principle of using different cyclic shifts for RF chains corresponding to adjacent beams, and obtain a digital beamformer using the acquired cyclic shift; a digital beamforming instruction 1728, which indicates to beamform the digital common signal in each RF chain using the digital beamformer in digital baseband.

In an example, the memory 1720 may further store: a cyclic shift calculating instruction 1729, which indicates to calculate the cyclic shift according to a maximum multipath delay spread of a channel impulse response and a size of discrete Fourier transform, and send the cyclic shift to the digital beamformer generating module.

What is claimed is:

1. A method for transmitting a common signal in hybrid beamforming, comprising:
    acquiring an analog common signal to be transmitted;
    dividing codewords in a codebook for analog beamforming into at least two codeword groups, wherein each codeword group includes at least one codeword;
    selecting different codeword groups for adjacent timeslots; for one timeslot, selecting a different codeword from the codeword group selected for the timeslot for each RF chain and obtaining an analog beamformer;
    beamforming the analog common signal to be transmitted in each RF chain according to the analog beamformer; and
    transmitting the beamformed analog common signal in each RF chain.

2. The method of claim 1, wherein codewords in the codebook for analog beamforming are divided into at least two codeword groups according to users' distribution.

3. The method of claim 1, before acquiring the analog common signal to be transmitted, further comprising:
    acquiring a digital common signal for generating the analog common signal to be transmitted;
    acquiring a cyclic shift for each RF chain according to a principle of using different cyclic shifts for RF chains corresponding to adjacent beams, and generating a digital beamformer using the acquired cyclic shift;
    beamforming the digital common signal in each RF chain using the digital beamformer in digital baseband.

4. The method of claim 3, further comprising:
    calculating the cyclic shift according to a maximum multipath delay spread of a channel impulse response and a size of discrete Fourier transform.

5. An apparatus for transmitting a common signal in hybrid beamforming, comprising: a processor and a memory communicated with the processor; in the memory, modules that are executed by the processor are stored, comprising an analog common signal acquiring module, a codeword group dividing module, an analog beamformer obtaining module, an analog beamforming module, and a signal transmitting module, wherein
    the analog common signal acquiring module, configured to acquire an analog common signal to be transmitted;
    the codeword group dividing module, configured to divide codewords in a codebook for analog beamforming into at least two codeword groups, wherein each codeword group includes at least one codeword;
    the analog beamformer obtaining module, configured to select different codeword groups for adjacent timeslots; for one timeslot, select a different codeword from the codeword group selected for the timeslot for each RF chain and obtain an analog beamformer;
    the analog beamforming module, configured to beamform the analog common signal to be transmitted in each RF chain according to the analog beamformer; and
    the signal transmitting module, configured to transmit the beamformed analog common signal in each RF chain.

6. The apparatus of claim 5, wherein the codeword group dividing module is configured to divide codewords in the codebook for analog beamforming into at least two codeword groups according to users' distribution.

7. The apparatus of claim 5, further comprising:
    a digital common signal acquiring module, configured to acquire a digital common signal for generating the analog common signal to be transmitted;
    a digital beamformer obtaining module, configured to acquire a cyclic shift for each RF chain according to a principle of using different cyclic shifts for RF chains corresponding to adjacent beams, and obtain a digital beamformer using the acquired cyclic shift;
    a digital beamforming module, configured to beamform the digital common signal in each RF chain using the digital beamformer in digital baseband.

8. The apparatus of claim 7, further comprising:
    a cyclic shift calculating module, configured to calculate the cyclic shift according to a maximum multipath delay spread of a channel impulse response and a size of discrete Fourier transform, and send the cyclic shift to the digital beamformer generating module.

* * * * *